April 10, 1934.    E. A. FORD    1,954,042
PUNCHING DEVICE
Filed Oct. 30, 1931    6 Sheets-Sheet 1
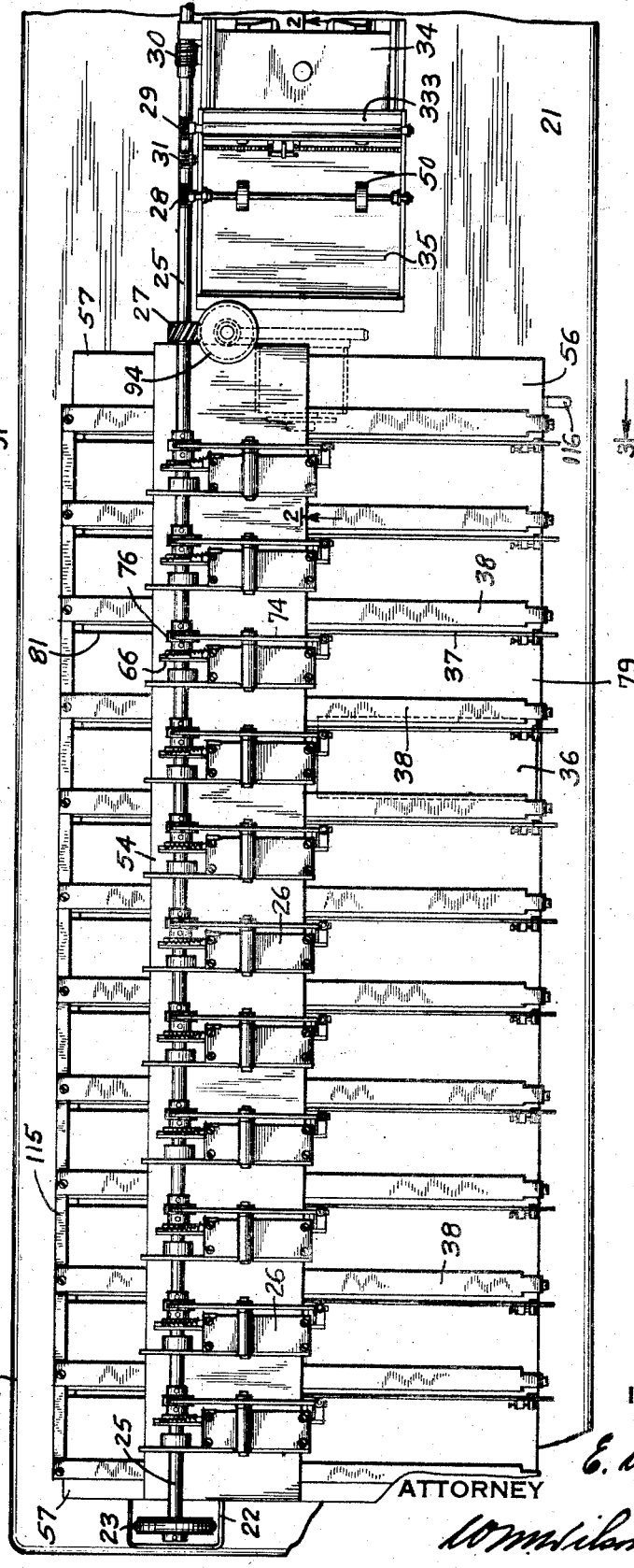

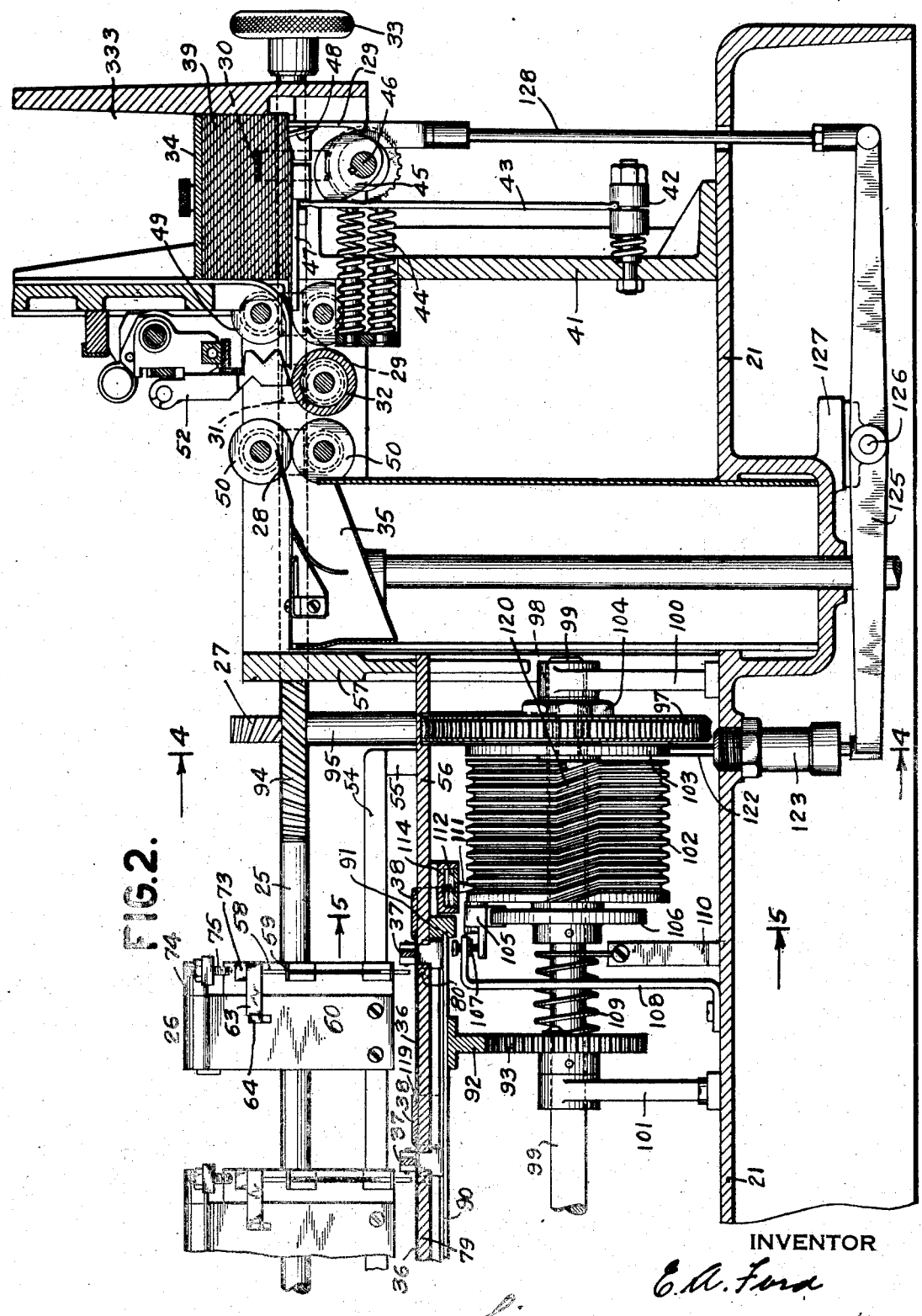

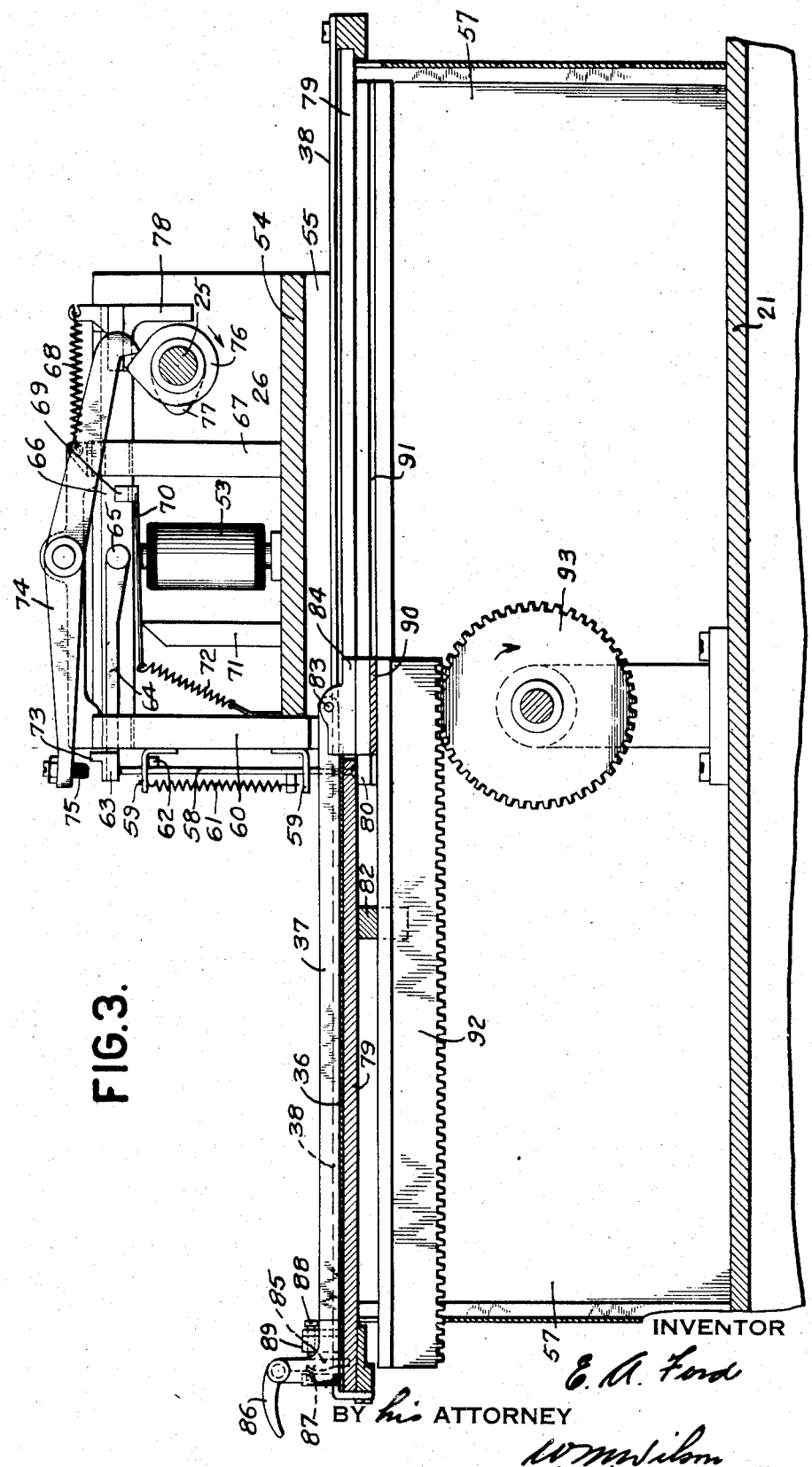

April 10, 1934.  E. A. FORD  1,954,042
PUNCHING DEVICE
Filed Oct. 30, 1931   6 Sheets-Sheet 4
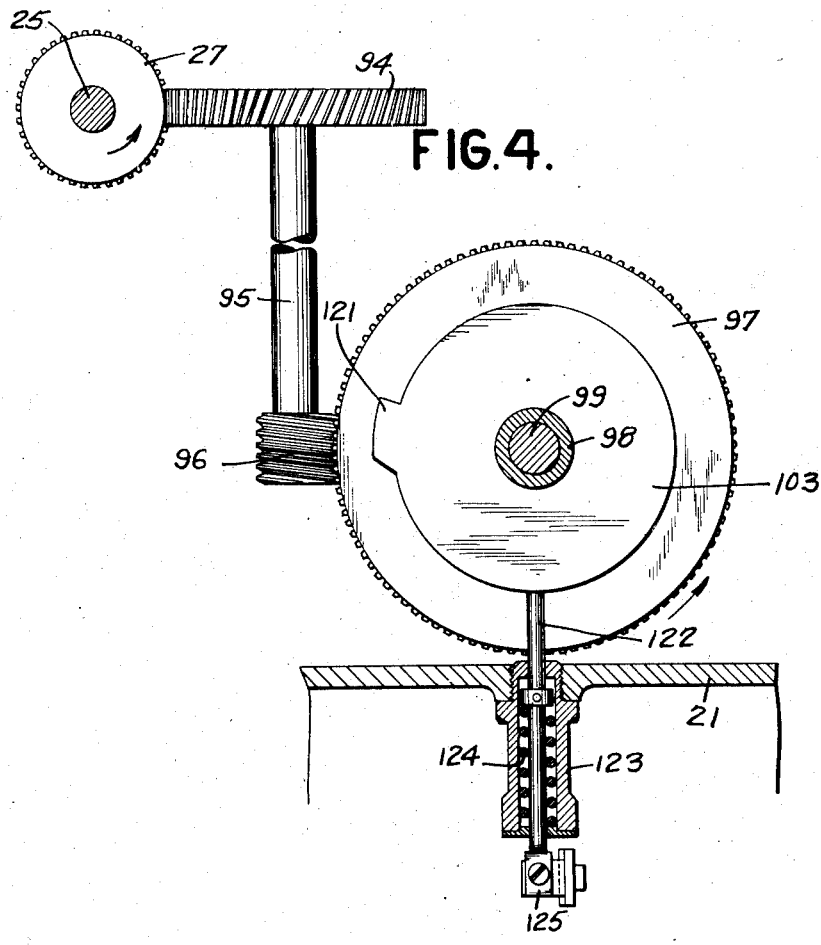
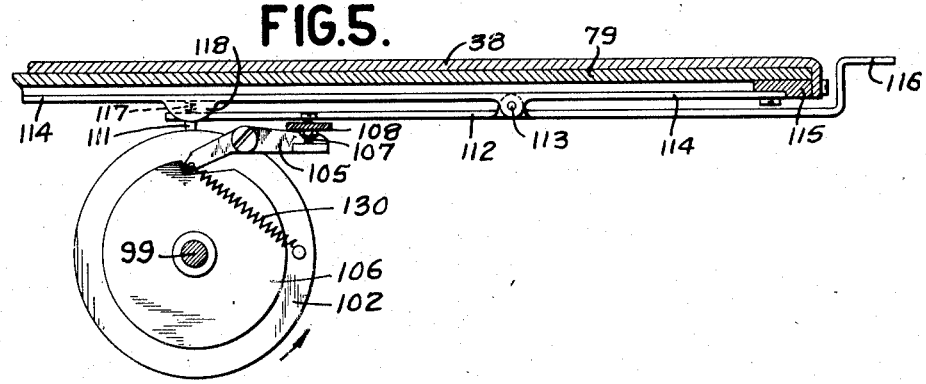
INVENTOR
E. A. Ford
BY his ATTORNEY April 10, 1934.                E. A. FORD                1,954,042
                            PUNCHING DEVICE
                         Filed Oct. 30, 1931         6 Sheets-Sheet 5
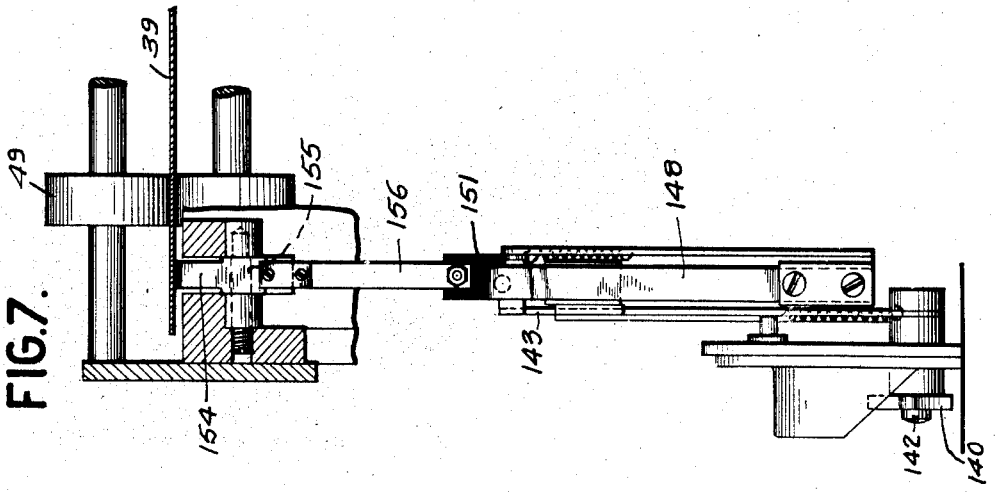
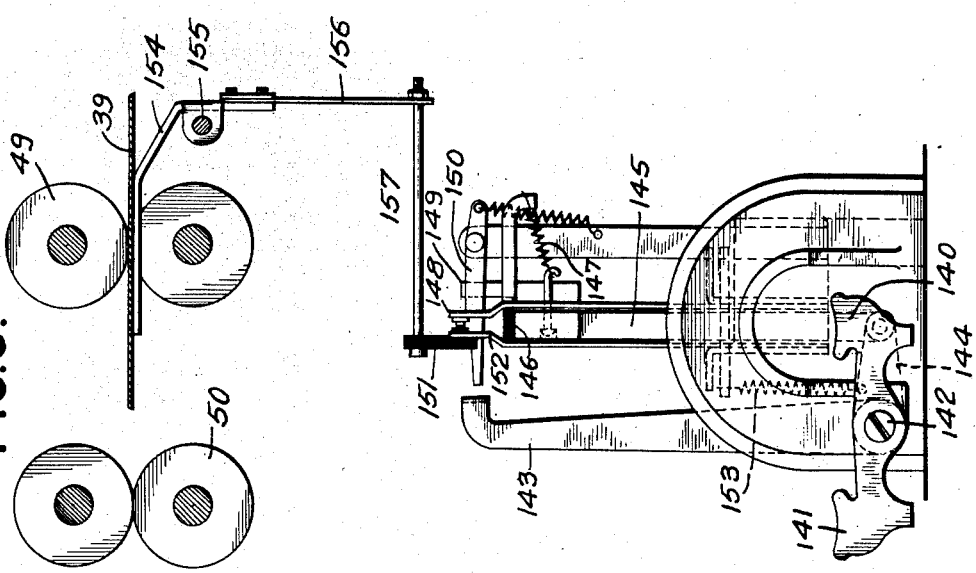
INVENTOR
E. A. Ford
BY his ATTORNEY April 10, 1934.  E. A. FORD  1,954,042
PUNCHING DEVICE
Filed Oct. 30, 1931  6 Sheets-Sheet 6

INVENTOR
E. A. Ford
BY ATTORNEY

Patented Apr. 10, 1934

1,954,042

UNITED STATES PATENT OFFICE 1,954,042

PUNCHING DEVICE

Eugene A. Ford, Scarsdale, N. Y., assignor, by mesne assignments, to International Business Machines Corporation, New York, N. Y., a corporation of New York Application October 30, 1931, Serial No. 572,079

15 Claims. (Cl. 164—115)

The invention relates to record card perforating devices.

The main object of the invention is to provide an improved form of record sheet feeding and perforating device.

A feature of the invention is the automatic production of cross-indexed records.

An object of the invention is to provide means for making a plurality of records to contain various information taken from a single record.

Another object is to furnish mechanism for making a single record from related data gathered from a plurality of other records.

An object is to provide an improved form of paper shifting and feeding device.

Another object of the invention is to provide records, automatically made from other records containing statistical data, for use in determining mathematical probability.

The illustrative machine of the present invention is adapted for use in many ways in solution of mathematical probability or for systems involving cross-indexing. One illustrative example will be explained in connection with the machine illustrated in the drawings. The example taken is one involving a class of statistics useful in analyzing the occurrence of disease. The result sought is to determine the probability of a complexity of diseases occurring in the same patient. For example, if a patient had disease A, what was the probability of his also having disease B? After it was determined by experience and observation that two or more diseases occurred in the same patient often enough to make it desirable to study their coincidence, a Hollerith record card was made out for each patient and the machine of the present invention is operated to make a series of separate disease or cross-index cards under control of the case or routine cards. A record is made by perforating a regular or routine card for recording the various diseases contracted by a patient.

From the routine card other forms of records for containing information concerning many cases having the same disease are made. A single column on the routine card is perforated in positions corresponding to various diseases. Column 1 of the routine card may be perforated in any one of its ten index point positions to show that the patient had any one or more of ten diseases.

The cross-index disease cards are provided with a thousand perforation receiving index positions, thus conditioning them to hold the record of one thousand cases involving a certain disease and cases not involving a disease but having related ailments. The case having the disease is indicated by a perforation on the cross-index card in a particular position and the cases free from the ailment are indicated by unpunched positions in the card.

The illustrative machine is shown as having the capacity to handle eleven cross-index cards simultaneously, ten cards representing various diseases and the other card recording the reject cases or routine cards that have not been punched in the disease column. The proposed cross-index card has one hundred columns with ten index point positions in each column. The index point positions in the horizontal 0 positions on the upper horizontal row represents the case numbers from 1 to 100. For example, the perforation in the 0 position of column 43 represents case 43. Similarly, perforations in the next lower horizontal row or the 1 index point position represents cases from 101 to 200. For example, a perforation in the 1 index point position in column 46 indicates case 146, the surface of the cross-index card thus having spaces for recording one thousand cases.

In order to punch the cross-index cards the routine cards are fed successively under a row of sensing brushes which analyze only one column of the card. The reading of an index point in the column by the brushes causes the punching of one of the cross-index cards according to the position of the index point in the column. A series of holes in the column indicating a plurality of diseases will cause the punching of a plurality of disease cards.

On feeding a second routine card, the cross-index cards are shifted to bring another index point position corresponding to the case number under the punches of the cross-index portion of the machine. Thus it is clear that each case having diseases to be studied is punched in its proper index position on several disease cards.

Now it is desired to study the results of the twelve disease records. Two or more of the cards may be placed together with the index point positions of the two coinciding. Then by observing where the perforations in the compared cards coincide, it may be determined how many cases and which cases have the complication of disease indicated by the series of disease cards brought together. For example, if disease cards A and B were placed together and it showed that case 563 was punched in both cards, it would indicate that patient bearing case number 563 had both diseases. Any case having only one of the diseases or having neither of them would not have registering perforations in the cards. Obviously any combination or number of disease cards could be placed together to determine the number of cases that had the combination of diseases.

The invention is illustrated by a set of drawings which accompany and form part of the specification.

In the drawings:

Fig. 1 is a plan view of the machine showing the disease card feeding and punching devices.

Fig. 2 is a sectional elevation view taken along line 2—2 in Fig. 1, and showing the card shifting and feeding devices for routine and cross-index cards.

Fig. 3 is a sectional side elevation view taken along line 3—3 in Fig. 1, and disclosing the punch actuating mechanism.

Fig. 4 is a sectional elevation view taken along line 4—4 in Fig. 2, showing the driving connection between the main shaft and the card shift cam drum.

Fig. 5 is a sectional detail view taken along line 5—5 in Fig. 2, showing the card shift operating connections and the card feed escapement.

Fig. 6 is a front elevation view showing the circuit control contacts and the controlling connections from the operating keys and card lever.

Fig. 7 is a side elevation view of the mechanism shown in Fig. 6.

Figure 8:
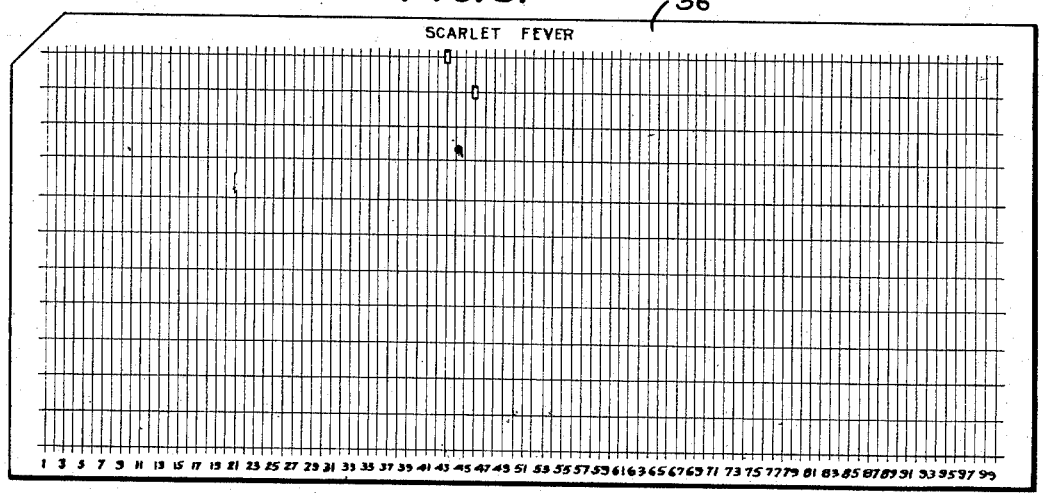
Fig. 8 is a detail view of one of the disease cards.

The framework of the machine is supported upon a base 21 (Figs. 1, 2 and 3) in which a hole 22 is cut to allow the passage of a belt 23 between an electric motor 24 beneath the base, and a pulley on a main drive shaft 25. This shaft runs through all of the eleven punch units 26 (Fig. 1) and has fixed to it near the right end, a helical gear 27 for operating the disease card shift devices, worms 28, 29, and 30 for feeding the routine cards, and worm 31 for rotating the routine card sensing roller 32 (Fig. 2). A hand wheel 33 (Fig. 2) extends from the right end of the machine for manual operation.

From Fig. 1 an understanding of the relative positions of the routine and disease cards may be had by noting that the stack of routine cards are placed in the hopper 333 under weight 34 and fed one at a time into stacker 35, while the eleven disease cards are placed separately in the partitions shown in the lower part of the view, just as card 36 is placed in one partition wherein it is engaged by lever 37 for longitudinal movement and engaged by partition slides 38 for lateral movement to the right in a manner to be described hereinafter.

Referring to Fig. 2 it is noted that the routine record cards 39 are held in the hopper 333 mounted upon a standard 41 fixed to the base 21. An adjustable fulcrum sleeve 42 supports a card feeding lever 43 pivotally mounted thereon and normally urged to the right by springs 44. A cam 45 mounted on a shaft 46 rotated by the worm 30, acts upon lever 43 to push it to the left early in each cycle of operation. At its upper end lever 43 carries a slide 47 with a picker blade 48 for advancing the bottom card 39 in the stack. The advanced card is caught between the first pair of feed rollers 49 driven by worm 29 and fed further into a second pair of feed rollers 50 which in turn eject the card into the stacker 35. Between the two pairs of feed rollers, the card 39 passes under a sensing brush 51 (Fig. 9) held in frame 52 over the contact roller 32 driven by worm 31. The brush 51 is set to test the index point positions in one column of the record card, and if one or more perforations are present in the column, electrical impulses are distributed through the brush to the magnets 53 (Figs. 3 and 9) in one or more of the eleven punch units 26 (Fig. 1).

All of the punch devices 26 are mounted upon a horizontal plate 54 (Fig. 3) supported at its ends upon upright strips 55. The strips in turn are mounted upon end plates 56 (Fig. 2) fastened to the main side frames 57. The punching devices are thus held stationary with the punch plungers 58 poised over the moving cross-index record cards 36. In Fig. 3 it is seen that the punch 58 is slidably mounted in two brackets 59 on frame member 60, with a spring 61 urging the punch upward until a stop 62 on the punch abuts against the lower side of the upper bracket. A stepped block or interposer 63 (Figs. 2 and 3) extending from a punch selecting arm 64 rests on the top of the punch. The lever is pivoted at 65 on a slide 66 which moves in grooves cut in support member 60 and vertical frame 67. A spring 68 stretches between the top of frame 67 and a clip on the end of slide 66, to urge a notched block 69 fixed to slide 66 into cooperation with the end of an armature 70.

A fulcrum block 71 provides the pivot about which the armature turns, it normally being urged into cooperation with the notched block 69 by a spring 72. However, when magnet 53 is energized armature 70 is pulled down, releasing slide 66 which, under the action of spring 68, is forced to the left (Fig. 3). When the slide is so positioned, the block 63 presents an upper shoulder 73 for actuation by punch operating lever 74. An adjustment screw 75 in the end of the left arm of lever 74 normally misses the upper ledge on stepped block 63, however, when the magnet is energized it is intended that the punch 58 be depressed, and this function is performed by the vibration of lever 74 and contact between screw 75, shoulder 73 on shifted block 63, and punch 58. Lever 74 is operated by a cam 76 fixed to the main drive shaft 25. Also fixed to the shaft 25 is a cam 77 cooperating with a depending extension 78 on slide 66. The cam drive is timed so that the routine card is first sensed, the punches are next operated by cam 76 and finally the selection slides are restored by cams 77. Each of the stationary plates 79 underlying the disease cards 36 is provided with a die perforation 80 into which the punch 58 is depressed to cut out the card as shown in Fig. 8. Although only one of the punch devices is described above, it is understood that all the units are constructed and operated in a similar manner, the only difference being in the operating magnet wiring connections to be described hereinafter.

Before considering the devices for shifting the disease cards it is well to study the layout of the index points on the cards and the movements required to bring the thousand index points on each card under the punch in succession. As may be noted in Fig. 8 each horizontal row has one hundred index point positions, there being one hundred vertical columns with ten index points in each. The punching or recording is started with the punch poised over index point #1 in the upper left hand corner of the card.

The card is then slowly drawn towards the left (Fig. 8) each index position registering with the punch as a related routine card is sensed, until the first one hundred routine cards are handled. Feeding of the routine cards is then suspended while the disease cards are shifted upward and to the right (Fig. 8) until the second row of index points are positioned with the first index point to the left beneath the punch ready to register the perforations under control of routine cards relating to cases 101 to 200. The card is then again moved slowly to the left bringing the index points successively beneath the punch in the same manner as that used in registration on the first row of the card. This feeding and alternate shifting of the card continues until all the rows are presented to the punch. The eleven disease cards are moved simultaneously with the same index point on each card presented beneath the eleven punches at the same time.

Turning now to Fig. 1 it is observed that the eleven cards are inserted in the machine with the rows of index points running longitudinally and parallel to the partition slides 38, the first index point appearing in the upper right hand corner of the card beneath the punch. Each card rests on one of the horizontal plates 79 separated by slots 81 from each other and connected by a bar 82 (Fig. 3) secured to the end plates 56 fixed to the main side frames 57. After the card is inserted in a partition, the lever 37 pivoted at 83 on a mounting block 84 is lowered, and a spring-urged finger 85 pivoted on the lever is brought into contact with the front edge of the card. The finger 85 has a horizontal arm 86 which may be engaged by the operator of the machine to raise the lever and release the card so that it may be withdrawn from the partition. A compression spring 87 mounted between an extension on the lever 37, and the finger 85 urges the card into contact with the front face of the carrying block 84. An adjustment screw 88 mounted on a block 89 fixed to the lever 37 limits the movement of the finger. Although the card is held from movement during the brief interval that the punch is in the card, yielding finger 85 permits the card feeding to continue without buckling the card.

The blocks 84 to which the levers 37 are mounted are all fastened to a slide plate 90 slidably mounted in notched guide frames 91 fastened to the end plates 56 (Fig. 2). When the plate 90 is pushed to the right (Fig. 3) by racks 92 and gears 93 all the levers follow and draw the cards slowly beneath the punches. At the end of the movement the gears are released and the racks snap the card back to the first index position in the next row. The movement of the gear is produced by connections from the main drive shaft to be described hereinafter. Turning to Figs. 2 and 4 it is noted that the helical gear 27 on the main shaft 25 meshes with a larger gear 94 on a vertical shaft 95. At the lower end of this shaft a worm 96 (Fig. 4) engages with a worm wheel 97 fixed to a bushing 98 loose on a horizontal shaft 99 extending through bearing blocks 100 and 101. In Fig. 2 it is noted that the bushing carrying the worm wheel 97 also carries a cam drum 102 and a cam plate 103 which is fastened to the bushing by nut 104. Pivoted to the side of cam drum 102 (Fig. 5) is a pawl lever 105 cooperating with a notched disk 106 fast to the shaft 99 running through the bushing 100 and extending to the left (Fig. 2) through a bearing 101. At the left end of the shaft a gear such as gear 93 meshes with another rack 92 on plate 90. The rack 92 (Fig. 3) is moved to the right through the engagement of pawl 105 (Fig. 2) with disk 106, until the end of a row on the disease card is reached after the feeding of 100 routine cards, then pawl 105 is tripped by an extending screw 107 on a fixed bracket 108 and the card frame is moved back by a restoring spring 109 fastened between gear 93 and a fixed mounting 110, until the first index position is under the punches.

The lateral movement of the disease cards is controlled by the cam drum 102 (Figs. 2 and 5). A follower in the form of pointer 111 extends into the groove cut in drum 102. This pointer is mounted on the end of a lever 112 pivoted at 113 on a plate 114 secured at its ends to guide slides 115. The front end 116 of lever 112 extends from the machine in position for manipulation by the operator. If the lever 112 is depressed against the action of compression spring 117 the pointer 111 may be lifted out of one part of the groove in drum 102 and the cards shifted to bring any row of index points under the punches.

The motion imparted to pointer 111 by the cam drum is transmitted to plate 114 by means of a pair of ears 118 extending from the plate and confining the end of the lever. The end slides 115 are guided by the under surface of the ends of plates 79 and 56. Fixed to the sides of these lower guide slides 115 (Fig. 5) are the partition plates 38 (see Fig. 1) making up the eleven spaces in which the disease cards are placed. The plates 38 on the guide slides comprise a grid-iron which is drawn to the right (Fig. 1) across the stationary plates 79 supporting the cards, thus shifting all the cards row by row under the punches. Each card is confined by means of overlying shoulders 119 on partition slides 38, as shown in Fig. 2.

In Fig. 2 it is noted that the groove in the cam drum 102 is shaped to allow the frame comprising partition slides 38 to remain in one row position for most of each revolution of the cam drum. The cam follower 111 rests in the straight portion of the groove in the cam during the time that the hundred index point positions in a row on the disease cards are brought beneath the punches. The cam portions 120 of the groove are reached when the last index point in each row is brought beneath the punch. They then serve to move the cards to the next row. The cam portions 120 each extend in length about one-tenth of the periphery of the cam drum. At the same time that a cam portion of the groove reaches the follower, the feeding of the routine cards is stopped by means of a connection to the stack of cards under the weight 34. The cam 103 (Fig. 4) has an extending portion 121 cooperating with a plunger 122 guided in the sleeve 123 fastened to the base plate 21. A spring 124 in the sleeve urges the plunger into cooperation with the cam. The lower end of the plunger abuts against one arm of a lever 125 (Fig. 2) pivoted at 126 on a bracket 127 extending from the base plate 21. On the other arm of the lever is pivoted a connecting rod 128 extending upwardly into the card hopper and provided with a finger 129 contacting the lower card in the hopper.

The above described linkage is so operated by the extension on cam 103 that when the last index point of the 100 points on a disease card reaches the position beneath the punch, cam portion 121 strikes the plunger 122 lifting the rod 128 and raising the cards out of the path of picker 48, thus disabling feeding of the routine cards during the time interval wherein the disease cards are shifted to a lower row and restored back to the first position of a row on the cards.

I have already noted that the longitudinal feeding of the disease cards is brought about through pawl 105 on drum 102, and gear 93. At a point in the rotation of drum 102 when the card reaches its last index position in a row, follower 111 reaches cam portion 120 at the same time that pawl 105 strikes the adjustment screw 107 lifting the pawl against the tension of spring 130 (Fig. 5) and disengaging it from the disk 106. The disk and the gears 93 also mounted upon shaft 99 are then free to be moved under the action of the large spring 109. The spring is tensioned during the normal clockwise rotation of gear 93 (Fig. 3) so that when the gear and its connections are released the spring acts to rotate the gear in a counterclockwise direction carrying with it the rack and levers moving the cards back to the first position in the row. The disk 106 escapes less than one revolution before it is caught again by pawl 105.

From the above description it may be gathered that the routine cards are fed in groups of 100, there being a pause between the feeding of the groups during which the shifting of the disease cards may take place; the shifting of the cards from row to row being performed by groove in the cam drum 102; the disabling of routine card feeding being under control of the cam 103 (Fig. 4); and the return of the disease cards to the first index position in a row being produced by the tripping of latch pawl 105 and action of spring 109.

The start and stop key mechanism is provided with controls adapting it to stop the machine when the supply of routine cards is exhausted. In Figs. 6 and 7 it is seen that the start key 140 is integral with the stop key 141 pivoted upon a common stud 142 to which is also secured an upwardly extending finger 143 and an arm 144 having connection at its free end to an upwardly extending member 145. Member 145 carries a block of insulating material 146 at its upper end and is biased by a spring 147 in a clockwise direction against contact blade 148. Member 145 also carries a hook 149 cooperating with a latch 150.

Depression of the start key 140 causes downward movement of the member 145 which first through its hook 149 rocks the pawl 150 against its spring to remove said pawl from cooperation with a block 151. Continued movement of the key 140 will then rock the finger 143 against the block 151 to move the spring blade contact 152 which abuts the opposite side of the block against contact 148 thus closing the circuit through the motor 24 to commence the operation of the machine.

If no cards are in the machine, release of the key 140 will permit spring 153 to restore the finger 143 to normal position and the tension of spring blade 152 will open the contacts to stop the machine. A card lever 154 is disposed in the path of travel of the card, and pivoted on rod 155 in such manner that continued feeding of cards will keep it in depressed position. To the lower arm of card lever crank 154 is secured a spring blade 156 to the end of which is fastened by a rod 157, the already mentioned block 151 so that through this mechanism the continued depression of the card lever causes the counterclockwise rotation of crank 154 and a continued tendency to move block 151 to the right as viewed in Fig. 6. Thus with the cards in the supply hopper, key 140 is depressed to close the contacts 148, 152 to start the machine, cards advancing through while the key is still depressed and by means of the control just pointed out move the block 151 against the blade 152 holding the same in closed position after key 140 is released.

The contacts will maintain this closed position until failure of cards to feed at which time block 151 will move to the left and contact blade 152 will follow due to its own tension.

The depression of stop key 141 while cards are feeding through the machine will, by turning stud 142 in a counterclockwise direction, move member 145 upwardly forcing the insulated block 146 between the blades 152, 148 to positively move the blade 152 away from the blade 148, being permitted to do so by the flexible nature of the spring blade 156 between block 151 and bell crank 154. Upon such opening of the contacts the latch 150 will snap under block 151 to hold the contacts open until the start key is again depressed. The normal position of the parts is shown as in Fig. 6 with the block 151 latched against operation so that in the event that the operator for some reason should turn the machine over by hand to feed a card into the machine the latch 150 would prevent the automatic closing of the circuit due to the cooperation between the card and the card levers 154.

Figure 9:
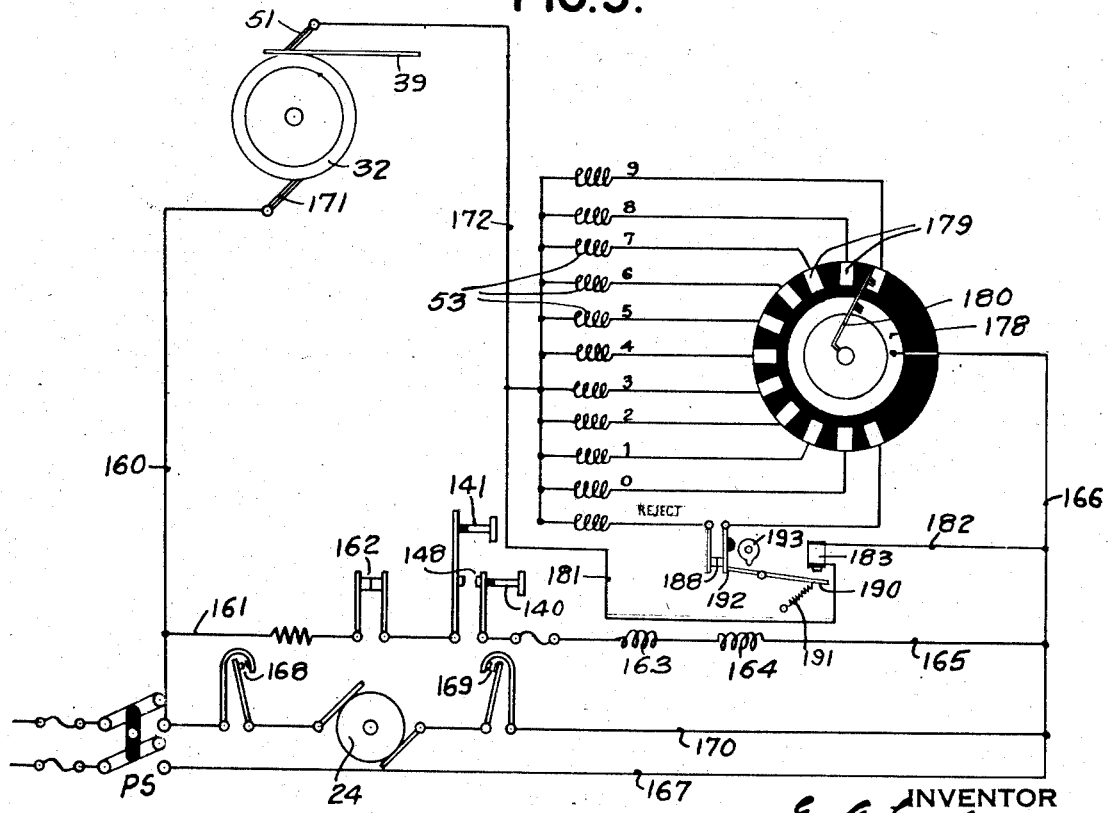
Fig. 9 is a wiring diagram of the electrical control of the machine.

The wiring diagram in Fig. 9 shows the connections between the power source, the driving motor and the punch magnets. The closing of switch PS connects the machine controls to the source of electric current. Depression of start key 140 closes contacts 148 and sets up a circuit through the line from wire 160, through wire 161, contacts 162, contacts 148, magnets 163 and 164, wires 165 and 166 to wire 167 and back to the other side of the line. The energization of magnets 163 and 164 causes them to actuate associated relays 168 and 169 which contain contacts in series with machine operating motor 24. The circuit through the motor runs from the one side of switch PS through contacts 168, motor 24, contacts 169, wire 170, wires 166 and 167 back to the other side of the switch. The motor 24 when operating serves to feed the cards and rotate sensing contact roller 32 by connections which are described hereinbefore.

A punch commutator brush 180 is also rotated by the motor 24 in synchronism with the feed of the card 39 past the analyzing brush 51. It engages commutator segments 179 successively and simultaneously with the analysis of the corresponding index point positions on the card by the analyzing brush. A portion of brush 180 is always in contact with a common contactor ring 178. Each one of the commutator segments 179 is connected to one of the punch magnets 53 associated with the disease card perforating devices. As the record card 39 is fed under brush 51, the presentation of perforations in the sensed column causes circuits to be set up through the following lines: wire 160, contact brush 171, roller 32, the brush 51 through a perforation in the card, wire 172, the punch magnet 53 and contact segment 179 corresponding to the perforation under the analyzing brush, through brush 180, contact ring 178 and wires 166, 167 to the other side of the supply. The energization of one or more of the magnets 53 serves to actuate the punches 58 (Fig. 3) to perforate the related disease cards in the index position corresponding to the case number of the sensed routine card.

Simultaneous with the energization of any of the magnets 53 associated with the 0 to 9 index positions on the card, another magnet 183 is energized through wires 181 and 182 connected across the commutator. This magnet 183 is provided with connections adapted to break the circuit through the punch magnet 53 associated with the reject card, thus preventing energization of the reject magnet during the same cycle so that any other magnets 53 are effective. The energization of magnet 183 attracts its armature 190 against the force of spring 191, moving the end of the armature away from the contact blade 192 of contacts 188 and permitting the blades to spring apart and open the contacts. When magnet 183 is deenergized armature latch 190 is unable to again close contacts 188 being restrained by contact with the lower edge of blade 192. A cam 193 is rotated by the motor 24 synchronously with the commutator.

A projection on the cam is adapted to engage an insulated portion of contact blade 192 to rock it to the left off the top of armature 190 during the interval between successive card feeds. The spring 191 then acts to move the armature upwardly to engage the side of the blade 192 and close contacts 188. The reject counter magnet is energized when the rear edge of the card leaves the analyzing brush, provided none of the other magnets is energized during the same card cycle. Should a perforation be read by the analyzing brush during the cycle, the contacts 188 will break and remain open until the beginning of the next card cycle as explained above, thus preventing energization of reject magnet 53 at the end of the cycle. The reject magnet will thus fail to be energized unless no perforations have been sensed during the card cycle. Should the latter condition occur, the contacts 188 will still be closed when the card leaves the analyzing brush, and a circuit be established upon engagement of the analyzing brush with the bare contact roll 32, through the reject magnet and corresponding commutator segment 179.

While I have shown, described and pointed out the fundamental novel features of the invention as applied to a single modification, it will be understood that various omissions and substitutions and changes in the form, details and operation of the device illustrated may be made by those skilled in the art without departing from the spirit of the invention. I intend to be limited therefore only as indicated by the scope of the following claims.

I claim:

1. In a machine for operating upon a record sheet provided with spaces for a plurality of rows of index points arranged in a plurality of columns, a perforating device, means for feeding the record sheet so that the index points in a row come successively beneath the perforating device, means under control of said feeding means and automatically operative as an incident to the appearance of the last index point in a row under the device, to shift the record sheet so that the first index point in the next row is placed under the perforating device, record cards, means for feeding said cards one by one in synchronism with the movement of said sheet from index point to index point, means for sensing data on said cards, and means under control of said sensing means for selectively operating said perforating device at each index point under control of one of said cards.

2. In a machine for operating upon a record sheet having a plurality of index point positions, means for feeding said sheet from one index point to the next index point for each datum entering operation of the machine, means for entering data of different classifications on a plurality of record cards, means for feeding one of said cards for each datum entering operation of the machine, means cooperating with said cards for selecting the datum entries of one classification, and means under control of said selecting means for indicating at a plurality of index points on said sheet the datum entries of one classification which have been selected from a plurality of record cards.

3. In a machine for operating upon a plurality of record sheets each having a plurality of index point positions, means for feeding said sheets from index point to index point, means for entering data of different classifications, and means under control of said last mentioned means for operating during each data entering operation to perforate the selected index points of a selected plurality of said sheets which are associated with the different classifications of a datum entry.

4. In a machine for operating upon a plurality of record sheets one for each class of data and each having a plurality of index point positions, means for entering data of different classifications, means for feeding said sheets from index point to index point for each data entry operation, and means under control of said data entering means for selecting the sheets relating to the classes of data associated with each entry and indicating at the same point on said selected sheets the identification of the entry.

5. In a machine controlled by a plurality of record cards each containing plural datum characteristics, for operating upon a set of cross index records each related to one characteristic registered on the record cards, perforating devices for said index records under control of said record cards, means for feeding the cross index cards with respect to said perforating devices so that the perforations received under control of different record cards have different positions on the cross index records, and means for perforating the cross index cards relating to the datum characteristics on each record card in the same position.

6. In a machine controlled by a plurality of record cards, for operating upon a record sheet having a plurality of index positions arranged in rows, means for feeding said cards through the machine, means for feeding said sheet one index point space for each record card fed through the machine, means for interrupting the feeding of said cards after a certain number of them have passed, means for shifting said sheet from row to row during said interruption, and means under control of said cards for making a record on said sheet.

7. In a machine controlled by a plurality of record cards, for operating upon a cross index card having a plurality of index points, each index point relating to one of said record cards, means for feeding the record cards, a punch under control of said record cards for perforating said cross index card, and means for feeding the cross index card from index point to index point under the punch during the feeding of the plurality of record cards relating to said index points.

8. In a perforating device controlled by a record card bearing datum characteristics in the form of perforations, for operating upon a plurality of cross index cards one for each characteristic registerable on the record card, means for sensing the perforations on the card, means for feeding the card through the sensing means, a plurality of punching members one for each cross index card, and means under control of said sensing means for actuating said punching members.

9. In a machine controlled by a perforated record card, for operating upon a plurality of cross index cards, means for reading the perforations in the card, perforating devices one for each cross index card and all adapted to cooperate with the related index cards during an operation of said record card reading means, and means under control of said reading means for operating one or more of said perforating devices.

10. In a machine controlled by a plurality of record cards, each having a column of index points perforated to represent datum characteristics, said machine operating upon a set of cross index records, one for each characteristic represented on the card and each having a plurality of index points, one for each record card, means for sensing the perforations on said cards as they are fed through the machine, means for feeding said cross index records from one index point to another as said record cards are fed through the machine, separate perforating devices one for each cross index record and its related datum characteristic on the record cards, and means under control of said sensing means for operating one or more of said perforating devices during the feeding of each record card.

11. In a machine controlled by a plurality of record cards, for operating upon a group of cross index cards, means for feeding said record cards, means for feeding said cross index cards, means for feeding each one of the record cards its entire width in synchronism with the feeding of the cross index cards from one index point to the next index point, and means under control of said record cards for recording data at selected index points on said cross index cards.

12. In a machine controlled by a plurality of perforated record cards, for operating upon a series of index cards, means for perforating said index cards under control of said record cards, means for feeding said record cards, means for shifting said index cards to bring a new row of index points under said perforating means, and means for disabling the feeding means during operation of the shifting means.

13. In a machine controlled by record cards perforated in a plurality of index point positions, for operating upon a series of cross index cards each corresponding to an index point position on the record cards, means for sensing the presence of perforations in said cards, means adapting each of said index cards to be perforated under control of any of said record cards, and means under control of said sensing means for perforating the index cards.

14. In a machine controlled by a plurality of record cards each bearing one or more perforations representing datum characteristics, said machine operating upon a plurality of cross index cards each corresponding to a characteristic of the data perforated on the record cards, and each having a plurality of index point positions one for each record card, means for sensing the record cards for perforations, means for feeding said cards to said sensing means, a plurality of devices for perforating the cross index records, means for feeding the cross index records to bring the index point position relating to the sensed record card in position for perforation, and means for operating one or more of said perforating devices under control of said sensing means.

15. In a machine controlled by a record card bearing datum characteristics in the form of perforations, for operating upon a plurality of cross index cards, means for sensing the card, means for feeding the card under the sensing means, a commutator, means for rotating the commutator in synchronism with the feeding of the record card, perforating devices for said records, magnets for operating said perforating devices, and connections from said magnets to said commutator for energizing certain magnets according to the perforations sensed in the record card.

EUGENE A. FORD.